US006569368B2

United States Patent
Machacek

(10) Patent No.: US 6,569,368 B2
(45) Date of Patent: May 27, 2003

(54) METHOD FOR MANUFACTURING A PLASTIC ZIPPER WITH END STOPS

(75) Inventor: Zdenek Machacek, Nanuet, NY (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/919,986

(22) Filed: Jul. 31, 2001

(65) Prior Publication Data

US 2003/0025243 A1 Feb. 6, 2003

(51) Int. Cl.⁷ .................. B29C 39/10; B29C 45/14; B29C 70/76
(52) U.S. Cl. ............ 264/155; 264/154; 264/157; 264/252; 264/263; 264/271.1; 24/30.5 L
(58) Field of Search .................. 264/250, 251, 264/254, 261, 263, 267, 273, 274, 145, 148, 154, 157, 155, 252, 271.1; 24/30.5 R, 30.5 L; 383/61.3, 97; 156/293

(56) References Cited

U.S. PATENT DOCUMENTS

| | | | | |
|---|---|---|---|---|
| 3,470,795 A | * | 10/1969 | Davis, Jr. .................. 156/251 |
| 3,986,914 A | * | 10/1976 | Howard ..................... 156/228 |
| 4,163,768 A | * | 8/1979 | Stephens ................... 264/163 |
| 4,581,006 A | * | 4/1986 | Hugues et al. ................ 29/768 |
| 4,842,799 A | * | 6/1989 | Kusayama .................. 264/252 |
| 5,088,971 A | * | 2/1992 | Herrington .................. 493/203 |
| 5,131,121 A | | 7/1992 | Herrington, Jr. et al. |
| 5,161,286 A | | 11/1992 | Herrington, Jr. et al. |
| 5,431,760 A | * | 7/1995 | Donovan ..................... 156/66 |
| 5,448,807 A | | 9/1995 | Herrington, Jr. et al. |
| 5,482,375 A | | 1/1996 | Richardson et al. |
| 5,536,343 A | * | 7/1996 | Kuse ......................... 156/201 |
| 5,833,791 A | | 11/1998 | Bryniarski et al. |
| 5,924,173 A | * | 7/1999 | Dobreski et al. .............. 24/387 |
| 5,937,615 A | | 8/1999 | Forman |
| 6,131,370 A | | 10/2000 | Ausnit |

FOREIGN PATENT DOCUMENTS

| | | |
|---|---|---|
| EP | 0 982 117 A2 | 3/2000 |
| EP | 1 123 796 A2 | 8/2001 |

* cited by examiner

Primary Examiner—Angela Ortiz
(74) Attorney, Agent, or Firm—Pitney, Hardin, Kipp & Szuch LLP

(57) ABSTRACT

A method for producing a zipper for use in the production of reclosable plastic bags of the type having the zipper extending across a top end of the bag. The zipper has a first profile member and a second profile member that is interengageable with the first profile member. At bag length intervals of the zipper notches are formed by removing at least a portion of the first profile member and a portion of said second profile member. A mold is positioned about each of the notches and a molten thermoplastic material is introduced into the mold cavity filling the notch and extending beyond the notch and over the zipper top so that when the molten thermoplastic material is cooled an end stop is formed in situ at each of said notches.

7 Claims, 2 Drawing Sheets

METHOD FOR MANUFACTURING A PLASTIC ZIPPER WITH END STOPS

BACKGROUND OF THE INVENTION

The present invention relates to reclosable packaging and, in particular to an improved zipper for use in the manufacture of such packaging.

Reclosable plastic bags are growing increasingly popular both for storage purposes and as primary packaging for food stuffs and other products. Such bags are formed with plastic zipper having profiles with mating interengageable elements. A problem that has been encountered with such zippers is that when the user opens the zipper, if too much force is exerted a run may develop down one or both side seams of the bag. To avoid this from happening, it has heretofore been proposed to crimp or crush the ends of the zipper. While such crimping works fine for sliderless packages, the result is not always satisfactory when a slider is provided to facilitate opening and closing the zipper elements. In such case, the slider may be pulled over the crimp and off the package if too much force is exerted.

In order to maintain the slider on the zipper profiles, it has heretofore been suggested to provide stops at the ends of the zipper. The prior art is replete with suggestions as to how the end stops may be formed. Thus, in U.S. Pat. No. 5,131,121 end stops are formed of the material at the ends of the zipper by deforming the material to extend outwardly from the sides of the bag. In U.S. Pat. No. 5,161,286, U.S. Pat. No. 5,448,807 and U.S. Pat. No. 5,833,791 a clip is provided at the ends of the zipper.

SUMMARY OF THE INVENTION

In accordance with the present invention a zipper is disclosed for use in the production of reclosable plastic bags of the type having said zipper extending across a top end of the bag. The zipper has a first profile member and a second profile member that is interengageable with the first profile member. The exact profile configuration may be one of many conventional shapes that are well known in the art. At bag length intervals of the zipper notches are formed by removing at least a portion of the first profile member and a portion of the second profile member. A mold is positioned about each of the notches and a molten thermoplastic material is introduced into the mold cavity filling the notch and extending beyond the notch and over the zipper top so that when the molten thermoplastic material is cooled, an end stop is formed in situ at each of the notches.

DETAILED DESCRIPTION OF THE PREFERRED EMBODIMENTS

Figure 1:
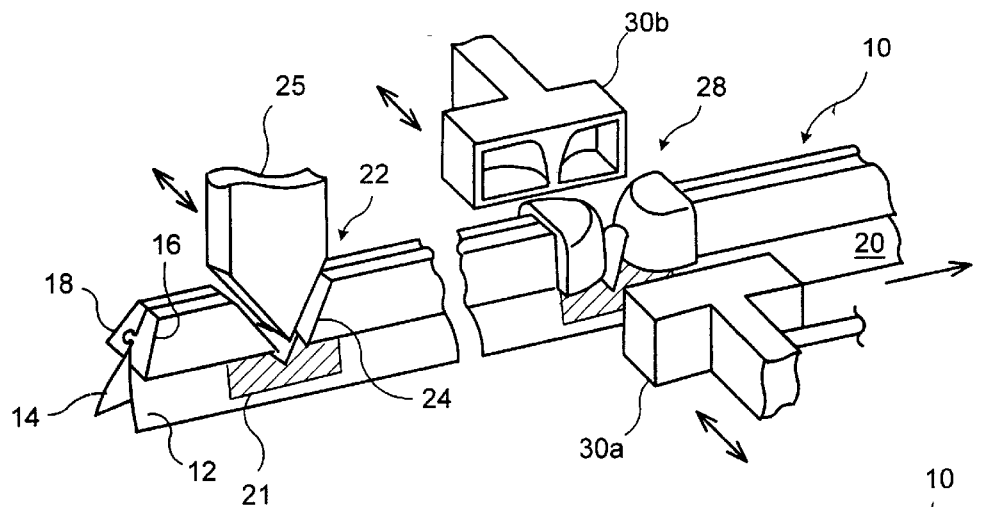
FIG. 1 is a schematic perspective view of a line for producing zippers in accordance with the present invention.
Figure 2:
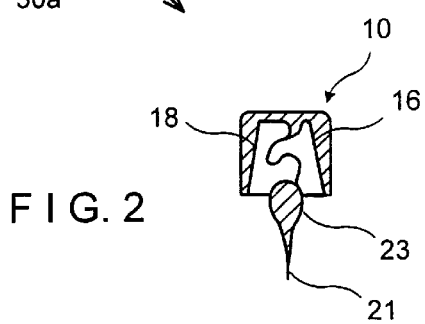
FIG. 2 is a profile view of the line depicting the stamping area and interlocking members.

Reference is now made to the drawings and to FIGS. 1 and 2 in particular wherein a length of zipper 10 is shown comprising a first elongated profile 12 and a second elongated profile 14. Each of the profiles 12, 14 consists of an interlocking element 16, 18 and an attachment flange 20. The configuration of the interlocking elements 16, 18 is such as to enable the elements to securely interlock with one another. Numerous such configurations are known to those skilled in the art. The attachment flanges 20 are provided to secure the zipper to a film of bag making material. The zipper 10 is conventionally formed of polyethylene but other thermoplastic materials may be used.

In accordance with the present invention, interlocking elements 16, 18 are joined together. Profiles 12 and 14 are stamped together to form a seal 21 in the area of the cutting of zipper 10. Stamping minimizes cavity 23 and stabilizes the profile of zipper 10 prior to cutting. Profiles 12, 14 are brought to a cutting station 22 at which a notch of plastic material is removed from the interlocking members of both profiles 16, 18. It should be noted that the flanges 20 remain intact so that the zipper segments on opposite sides of the notch 24 remain joined together.

Figure 4:
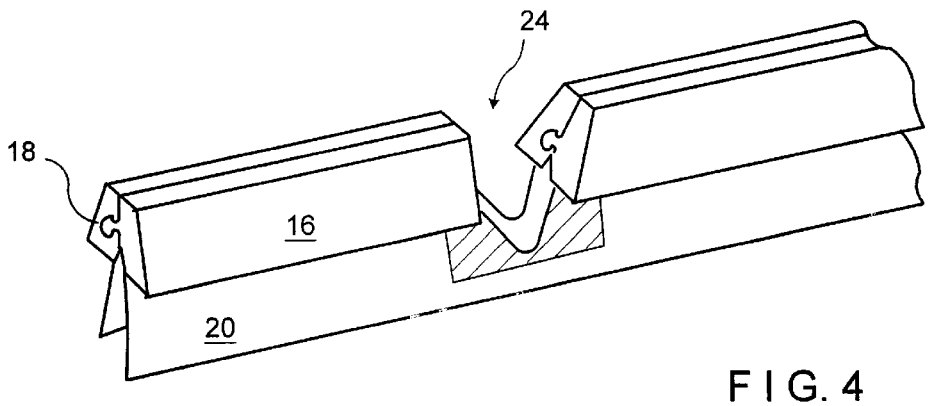
FIG. 4 is a perspective view of a first embodiment of zipper notching in accordance with the present invention.
Figure 5:
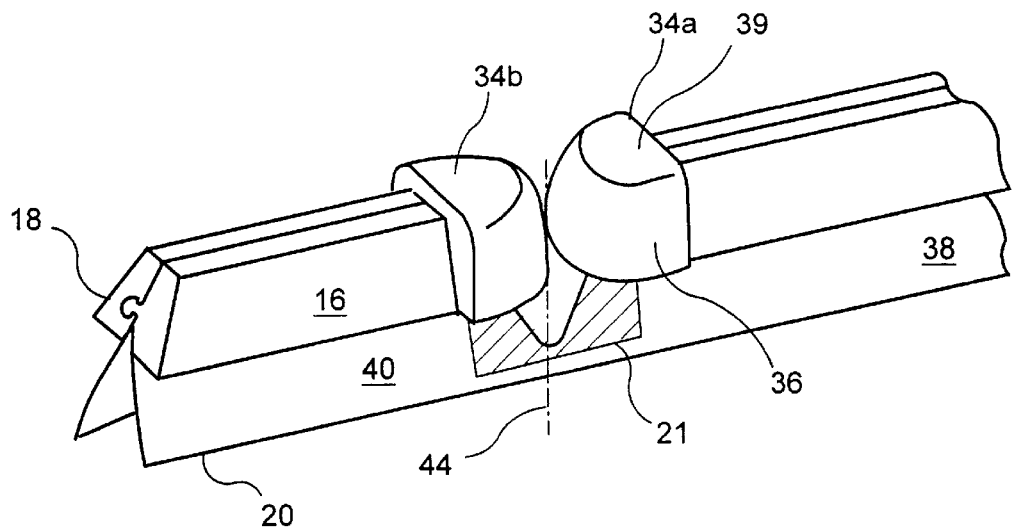
FIG. 5 is a perspective view of the zipper of FIG. 4 with end stops molded in situ.

The notching may be performed by die cutting, milling out the plastic material of the interlocking members with a milling machine 25 or with a punch or knife. As shown in FIG. 4, at notch 24 the material of the interlocking members is entirely removed with a "V" notch showing. The "V" notch is the result of cutting the end of the profile of zipper 10 at an angle. This style cutting increases holding power and allows for easy cavity filling for a complete leak-proof end-stop. Notches 24 are formed along the zipper at bag-length intervals so that the spacing between adjacent notches results in zipper segments that correspond to the length of a bag that is to be formed with the zipper 10.

Figure 3:
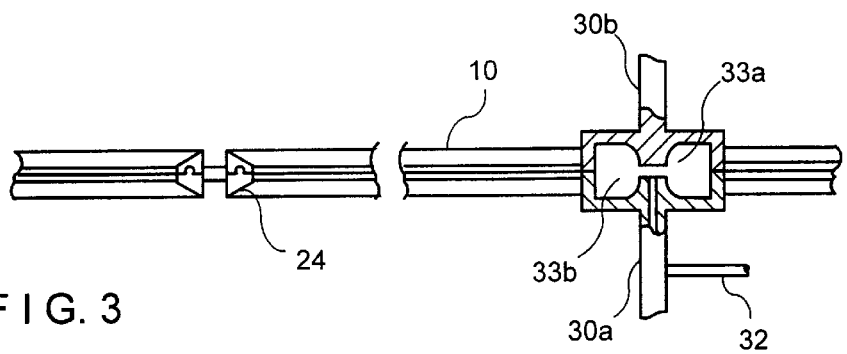
FIG. 3 is a top plan view of the line of FIG. 1.

As shown in FIG. 1, after the zipper 10 is notched, the notching device 25 is withdrawn and the zipper is advanced so that the notch is brought to a molding station 28, shown in FIG. 1. As shown in FIG. 3, at the molding station 28 mold halves 30a and 30b are closed and a thermoplastic material is simultaneously introduced into the mold cavities 33a and 33b though line 32 to form end stops 34 in situ about the joined profiles 12 and 14, such that end stops 34 overlap the cut of the V notch to give a complete seal of the end stops. Each of the molds 30a and 30b includes two cavities 33a and 33b which are mirror images of each other. The mold cavities 33a and 33b are configured to form an end stop 34a at a lagging end of one zipper segment 38 (at the leading side of the notch 24) and a segment 34b at the leading end of the next zipper segment 40 (at the lagging side of the notch 24). The end stops 34a and 34b are each provided with sides 36 abut the interlocking members 16 and 18 of the profiles and a cap 39 that goes over the top of the zipper and joins the sides 36. The end stops may be molded of polyethylene or a material such as EVA that may readily be sealed to polyethylene or the material from which the zipper is formed. Seal 21 provides increased holding pressure to prevent separation at the end of the end-stops.

Figure 6:
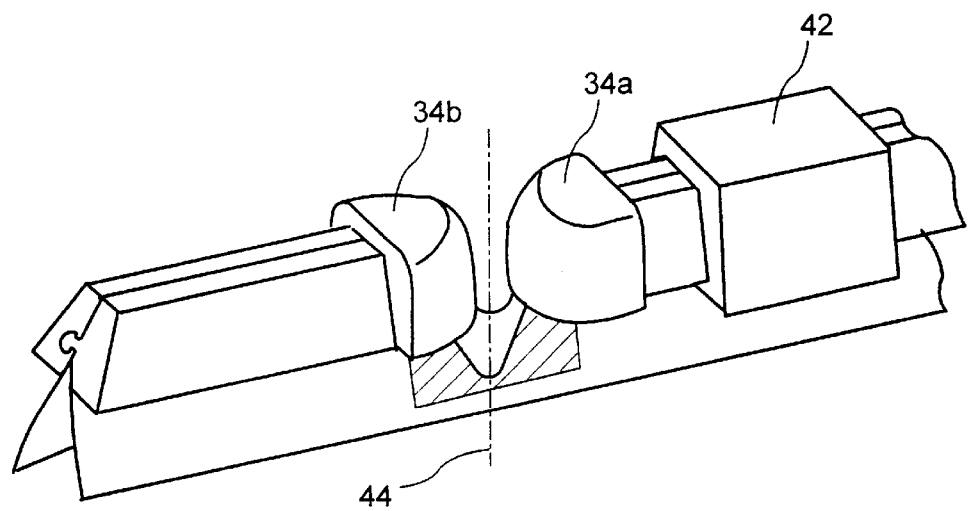
FIG. 6 is a view with a slider in position and indicating the cut position for a length of zipper to be attached to a package.

After the end stops 34a and 34b are formed, a slider 42 is positioned on each leading zipper segment 38 as shown in FIG. 6. The zipper with attached sliders 42 and end caps 34a and 34b is then brought directly to bag making equipment (not shown) or spooled to be subsequently brought to such equipment. At the bag making equipment, flange 20 is cut between adjacent end caps 34a and 34b (along line 44) and the zipper is attached to the bag making film in the usual manner by sealing flanges 20 of the zipper to the film.

Thus, in accordance with the above an efficient method of forming zipper with end stops at predetermined lengths is disclosed.

Having thus described the invention, what is claimed is:

1. A method of manufacturing a zipper for use in the production of reclosable plastic bags having said zipper extending across a top of the bag, said zipper comprising a first profile member and a second profile member interengageable with said first profile member, said method comprising the steps of:

notching out said zipper at bag length intervals of said zipper to form a series of spaced notches by removing at least a portion of said first profile member and a portion of said second profile member;

positioning a mold about each of said notches;

introducing a molten thermoplastic material into said mold; and cooling said molten thermoplastic material whereby to form an end stop in situ at each of said notches.

2. The method in accordance with claim 1 wherein a lagging end of a first bag length interval of zipper is simultaneously notched with the leading end of the next bag length interval of said zipper.

3. The method in accordance with claim 2 wherein said mold is positioned about the notch formed in the lagging end of the first bag length interval of zipper and the notch formed in the leading end of the next bag length interval of said zipper.

4. The method in accordance with claim 2 wherein the notch formed in the lagging end of the first bag length interval of zipper is spaced apart from the notch formed in the leading end of the next bag length interval of said zipper.

5. The method in accordance with claim 1 comprising the further step of positioning about a top end of said zipper at each of said bag length intervals a slider for engaging and disengaging said profiles.

6. The method in accordance with claim 1 wherein said profiles are formed of a first thermoplastic material and said molten material comprises a second thermoplastic material.

7. The method in accordance with claim 1 wherein said notching out of the zipper removes a "V" shaped segment.

* * * * *